(12) United States Patent
Franklin et al.

(10) Patent No.: US 9,846,540 B1
(45) Date of Patent: Dec. 19, 2017

(54) DATA DURABILITY USING UN-ENCODED COPIES AND ENCODED COMBINATIONS

(71) Applicant: Amazon Technologies, Inc., Reno, NV (US)

(72) Inventors: Paul David Franklin, Lake Forest Park, WA (US); James Christopher Sorenson, III, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 178 days.

(21) Appl. No.: 13/970,291

(22) Filed: Aug. 19, 2013

(51) Int. Cl.
  *G06F 12/00* (2006.01)
  *G06F 13/00* (2006.01)
  *G06F 13/28* (2006.01)
  *G06F 3/06* (2006.01)

(52) U.S. Cl.
  CPC .............. *G06F 3/061* (2013.01); *G06F 3/065* (2013.01); *G06F 3/067* (2013.01)

(58) Field of Classification Search
  CPC ............. G06F 11/1076; G06F 11/1092; G06F 2211/1028; G06F 3/067; G06F 3/0619; G06F 3/0647; G06F 3/061; G06F 3/065
  USPC ........................................................ 711/162
  See application file for complete search history.

(56) References Cited

U.S. PATENT DOCUMENTS

| | | | | |
|---|---|---|---|---|
| 5,392,244 A * | 2/1995 | Jacobson | ............ | G06F 11/1076 711/114 |
| 6,442,562 B1 * | 8/2002 | Carey | ................. | G06F 17/3048 705/30 |
| 6,931,418 B1 * | 8/2005 | Barnes | .............. | G06F 17/30333 707/600 |
| 7,930,611 B2 * | 4/2011 | Huang | ............... | H03M 13/1191 714/752 |
| 8,099,549 B1 * | 1/2012 | Madnani | ............... | G06F 3/0611 370/312 |
| 8,250,427 B2 * | 8/2012 | Wylie | ................... | H03M 13/01 714/6.2 |
| 8,364,891 B2 * | 1/2013 | Margolus | ............ | G06F 11/1096 711/114 |
| 8,453,036 B1 * | 5/2013 | Goel | ................... | G06F 11/1096 714/763 |
| 8,458,287 B2 * | 6/2013 | Ozzie | .................. | G06F 11/1004 707/637 |

(Continued)

OTHER PUBLICATIONS

U.S. Appl. No. 13/216,100, filed Aug. 23, 2011, Kerry Q. Lee et al.

(Continued)

*Primary Examiner* — Sheng-Jen Tsai
(74) *Attorney, Agent, or Firm* — Robert C. Kowert; Meyertons, Hood, Kivlin, Kowert & Goetzel, P.C.

(57) ABSTRACT

Methods and apparatus for data durability using un-encoded copies together with combination encodings are disclosed. Additional storage objects to be included in a durability group with a particular storage object are identified. An encoding of a combination of the particular object and another object of the group is generated. The encoding, as well as an un-encoded copy of the particular object, may be stored at respective nodes of a service. A request to perform a computation operation may be directed to a node with the un-encoded copy. In the event that the un-encoded copy becomes unavailable, a new un-encoded copy may be generated using the encoding.

20 Claims, 9 Drawing Sheets

(56) References Cited

U.S. PATENT DOCUMENTS

| | | | | |
|---|---|---|---|---|
| 8,473,778 B2 * | 6/2013 | Simitci | ............... | H03M 13/373 714/6.2 |
| 8,682,942 B1 * | 3/2014 | Lee et al. | ....................... | 707/812 |
| 2006/0101062 A1 * | 5/2006 | Godman | ............... | G06F 9/5038 |
| 2007/0245082 A1 * | 10/2007 | Margolus et al. | ............ | 711/114 |
| 2008/0151724 A1 * | 6/2008 | Anderson | ............ | G11B 33/127 369/53.42 |
| 2008/0222480 A1 * | 9/2008 | Huang et al. | ................. | 714/752 |
| 2008/0313241 A1 * | 12/2008 | Li | ........................ | G06F 11/1076 |
| 2010/0083069 A1 * | 4/2010 | Wylie et al. | ................... | 714/752 |
| 2010/0091839 A1 * | 4/2010 | Wu | ............... | H04N 21/234327 375/240.02 |
| 2010/0161567 A1 * | 6/2010 | Makela | ............. | G06F 17/30501 707/693 |
| 2010/0218037 A1 * | 8/2010 | Swartz | .................... | G06F 17/30 714/6.12 |
| 2011/0029840 A1 * | 2/2011 | Ozzie et al. | .................. | 714/763 |
| 2012/0060072 A1 * | 3/2012 | Simitci et al. | ................ | 714/756 |
| 2013/0132800 A1 * | 5/2013 | Healey, Jr. | ............ | G06F 3/0607 714/769 |
| 2013/0138918 A1 * | 5/2013 | Muff | .................... | G06F 15/7832 712/24 |
| 2014/0281784 A1 * | 9/2014 | Verma | ................. | G06F 11/1092 714/752 |
| 2014/0324920 A1 * | 10/2014 | Hamilton | .......... | G06F 17/30592 707/812 |
| 2015/0046747 A1 * | 2/2015 | Gaertner | ............. | G06F 11/1666 714/6.11 |
| 2015/0178162 A1 * | 6/2015 | Marov | ................. | G06F 11/1076 714/6.24 |

OTHER PUBLICATIONS

"Amazon Simple Storage Service: API Reference" Mar. 2006 Amazon Web Services, Inc. pp. 1-280.

"Amazon Simple Storage Service: Developer Guide" Mar. 2006 Amazon Web Services, Inc. pp. 1-491.

"Amazon Simple Storage Service: Getting Started Guide" Mar. 2006 Amazon Web Services, Inc. pp. 1-20.

"Amazon Simple Storage Service: Console User Guide" Mar. 2006 Amazon Web Services, Inc. pp. 1-62.

* cited by examiner

DATA DURABILITY USING UN-ENCODED COPIES AND ENCODED COMBINATIONS

BACKGROUND

Several leading technology organizations are investing in building technologies that sell "software-as-a-service". Such services provide access to shared storage and/or computing resources to clients or subscribers. Within multi-tier e-commerce systems, combinations of different types of physical and logical resources may be allocated to subscribers and/or their applications, such as whole physical or virtual machines or storage devices, key-addressable object storage, CPUs, memory, network bandwidth, I/O capacity, or bundled resources such as database servers, scientific computation clusters, and the like.

For many storage services, the significant selling points of the service may include very high levels of data durability, suitable for enterprise-level mission-critical applications. Some network-accessible storage services may be designed to support data durability levels of 99.99999999% or higher, for example. Such high levels of durability may be difficult for businesses and individuals to support economically on their own premises, making the prospect of using the network-accessible storage service extremely attractive, at least for the more important or valuable portions of client data.

One straightforward approach to supporting high durability involves storing redundant copies of objects. For example, writes to storage objects may typically be replicated at several storage devices in such environments, often at different physical locations. In order to reduce storage costs while maintaining high durability levels, sophisticated algorithms may be used that divide a given storage object into smaller partitions or segments and then distribute encodings of the partitions among numerous storage devices. Such approaches, which can include various types of erasure coding techniques, may provide similar durability to simpler replication strategies, while requiring less storage than the simpler replication strategies. However, in high-durability storage systems that rely on encoding partitions of storage objects, the costs of decoding and re-assembling the encoded partitions may become significant, at least for some types of applications.

Figure 1:
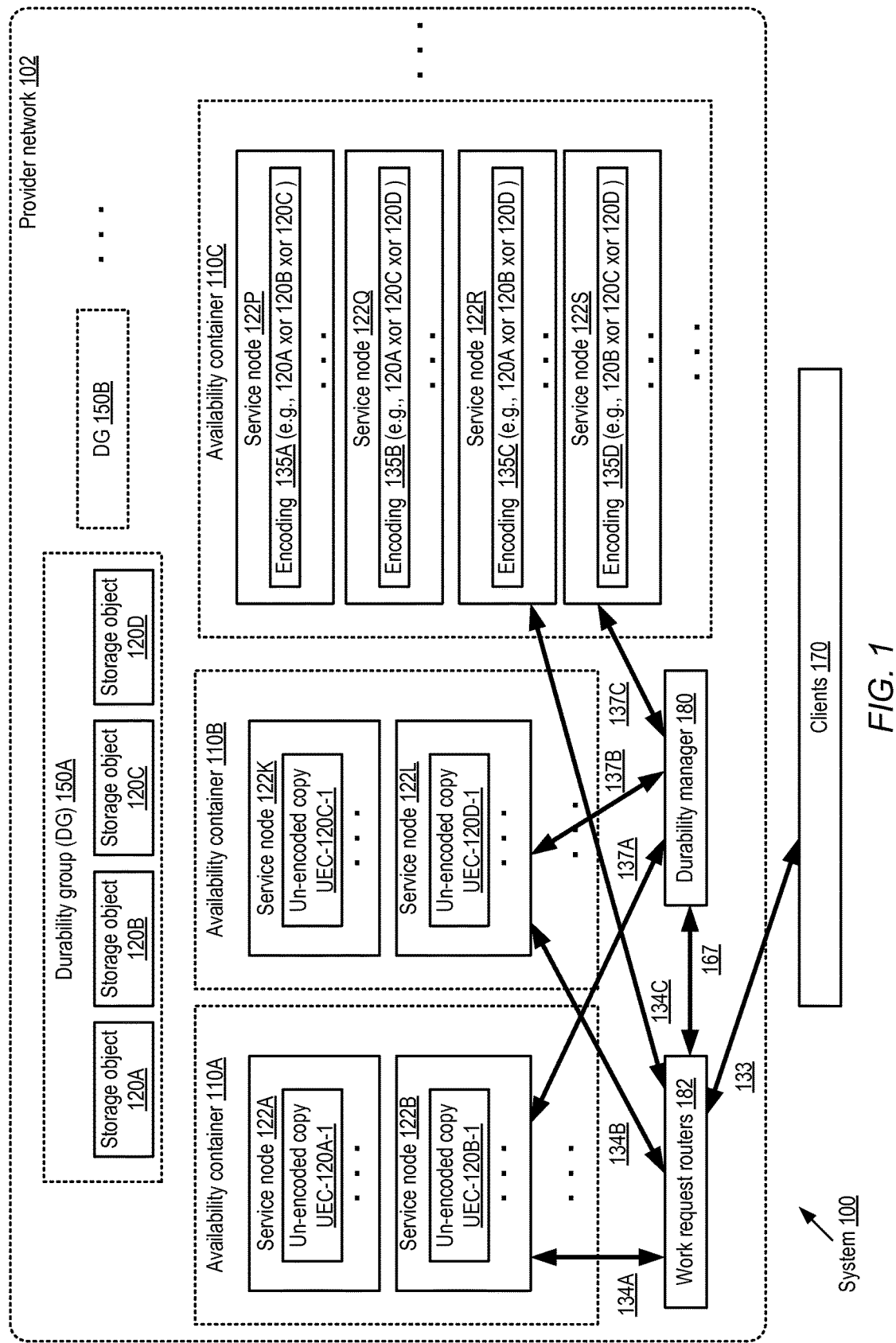
FIG. 1 illustrates an example of a system in which a storage service is configured to support high durability using un-encoded copies and encoded combinations of storage objects, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing data durability for storage objects at a provider network using un-encoded copies and combination encodings are described. Networks set up by an entity such as a company or a public sector organization to provide one or more network-accessible services (such as various types of cloud-based storage, computing or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

In some embodiments, a storage service of a provider network may be designed to support configurable levels of durability for different sets of storage objects, e.g., based on respective service level agreements entered into with clients of the service. Generally speaking, the manner in which the client-visible data of a file or a key-indexed object is physically organized or stored at some combination of one or more storage devices may be controlled by the service, and details of the physical layout of the data need not be disclosed to the clients, as long as the service level agreements are met. The storage service may, for example, decide to partition or shard the client's data in various ways, and/or use techniques such as erasure coding to provide the desired levels of data durability, performance, high availability, and/or security. Using sophisticated encoding schemes may help to reduce the total amount of storage space required for a given level of durability, e.g., relative to storing several full un-encoded copies of the data. For some types of operations requested by clients in scenarios in which encoded versions and/or partitions of the data objects are stored, the service may generally be responsible for reconstructing the un-encoded versions (e.g., versions in which a requested subset or all of the contents of the storage object are presented in a format expected by the client), and providing the un-encoded versions to the clients. Thus, in one such embodiment, a client may wish to store M megabytes of text in a given storage object S. The service may divide the object S into N partitions, each with M/N megabytes of text, and store some number of encodings E of the partitions on K different storage devices, e.g., using erasure coding to achieve a desired durability level while optimizing the amount of space that is used. In response to a request to read the object S, the service may have to retrieve the encodings E from some subset or all of the K devices, perform the computations needed to decode the encodings E into the N partitions, concatenate the N partitions in the correct order, and provide the reconstructed object to the requesting client.

In some embodiments, the storage service may support a set of "local" computation operation types to be performed by the service on contents of client-owned storage objects at client request. Such operation types may be termed "local" with respect to the storage service because they may typically be implemented on the storage devices or nodes at which the client's data is stored, instead of being performed at the client's own computing devices after the client has received an un-encoded copy of the storage object from the service. For example, in one such embodiment, a local operation to determine, for a storage object that comprises text, how many times (and/or in which specific lines of text) a specified string or regular expression occurs, similar to the "grep" command supported in certain operating systems, may be supported by the storage service. If all the contents of a particular storage object are stored in an encoded format, the service may have to use nontrivial amounts of computation to first decode the contents, and then perform the text search operations corresponding to the grep command. Accordingly, in at least some embodiments, a hybrid approach may be used, in which some number of un-encoded copies of the full storage object are stored, and some number of encodings are also stored. The un-encoded copies may be preferred for performing the local computations, while the encoding may be used to reconstruct the un-encoded copies in the event of data loss, as described below in further detail. Such a hybrid approach may help the storage service achieve both (a) desired durability levels with space efficiency comparable to that of a fully-encoded approach, and (b) computational efficiency that results from access to un-encoded copies of the data.

According to at least one embodiment, as part of such a hybrid approach, a durability manager of a storage service may classify storage objects into durability groups (DGs), and then store encodings of several members of the durability groups taken together, as well as un-encoded copies of each of the members. The durability manager may thus be configured to identify a set of one or more other storage objects Sk to be included in a DG with a particular storage object Sj, where an encoding of a combination of at least the particular storage object Sj and one other storage object of the DG is to be stored at a node of the storage service to achieve a target data durability. The durability manager may also determine a number U of un-encoded copies of the particular storage object Sj to be stored, in addition to the encoding, to achieve the target data durability and a desired level of performance for a set of local computation operation types supported by the storage service. The set of un-encoded copies and encodings corresponding to a given DG may be referred to as the "artifacts" or "durability artifacts" of the DG herein. An encoding plan for the particular storage object Sj may then be generated in at least some embodiments, specifying (a) the specific storage objects of the durability group to be combined for the encoding, (b) a computation function to be used to obtain the encoding, and (c) a placement map indicating nodes of the storage service to be used to store the U un-encoded copies and the encoding. In accordance with the placement map, the encoding and the U un-encoded copies of the particular storage object may be stored at various selected nodes of the service. When a request to perform a local computation operation of a type included in the set of local computation operation types is received, the request may be directed to a particular node of the storage service at which an un-encoded copy of the particular storage object is located. In the event of a failure, e.g., in response to a detection that at least one of the un-encoded copies of the particular storage object is inaccessible, a new un-encoded copy of the particular storage object may be reconstructed based at least in part on the encoding. The same kind of approach may be taken for each of the other members Sk of the durability group—e.g., some number of un-encoded copies may be stored and used for supported local computations, and some set of encodings may be stored, such that the encodings may be used to re-generate the un-encoded copies in the event of failures. Storing encodings of the combinations of storage objects, rather than all of the storage objects separately, may help amortize the added storage costs typically incurred for high durability.

A number of different criteria may be used to identify the specific storage objects that are to form a given durability group in various embodiments. For example, in one embodiment, storage objects may be included in a durability group based on similar sizes, proximity in the timing of write requests to the storage objects (e.g., two objects to which writes were directed within a few milliseconds of each other may be included in a single durability group with a higher probability than objects to which the most recent writes were directed minutes or hours apart), common ownership by the same client entity, logical relationships between the objects (e.g., objects belonging in the same directory of a namespace may be more likely to be included in the same durability group than objects belonging to different directories), and so on. The formation of a new durability group, and/or the inclusion of a particular storage object in an existing durability group, may be triggered in some embodiments by the occurrence of an event—e.g., such durability group membership decisions may be triggered in response to receiving a write request from a client.

The number of un-encoded and/or full copies of a given storage object, as well as other details of the encoding plan, may be selected based on various combinations of criteria in different embodiments. For example, such criteria may in one embodiment include one or more of: (a) the size of the given storage object, (b) an expected frequency of local computation operations directed at the given storage object, (c) an expected frequency of access requests directed at the given storage object, (d) an expected lifetime of the given storage object (e.g., how long the storage object is expected to remain accessible before being deleted), (e) a metric of an expected amount of computation required to reconstruct the given storage object based at least in part on the encoding, or (f) a metric of a computational capacity of a node of the storage service at which either an un-encoded copy of one or more of the members of the durability group, or one or more encodings of the durability group members are to be stored.

In some embodiments, large provider networks supporting storage services of the kind described above may be organized into hierarchies based for example on geographical location or infrastructure failure independence. For example, a provider network may comprise a plurality of geographically distributed data centers, grouped into geographical regions, such as a "U.S. East" region, a "U.S. West" region, an "Asia-Pacific" region, and so on. In some embodiments, the provider network may comprise a plurality of "availability containers". Each availability container may include a respective set of resources resident at one or more data centers, engineered in such a manner that effects of a failure within one availability container may not be expected to spread to any other availability container. For example, components of the power, cooling, networking, and security infrastructure may be set up in such a way that failures across different availability containers are not correlated. The various availability containers (which may also be referred to as availability zones) may be said to have independent failure profiles and independent availability profiles in such embodiments. According to some embodiments, the un-encoded copies and the encodings associated with a given storage object may be distributed among different availability containers of the provider network. For example, in accordance with the placement map generated by the durability manager, one un-encoded copy of a particular storage object may be stored in a first availability container, a second un-encoded copy may be stored in a second availability container, and an encoding may be stored in a third availability container.

According to at least one embodiment, a given storage service node, or a given storage device used by the storage service, may be configured to store un-encoded copies of some set of storage objects, as well as encodings of some set of storage object combinations. Thus, in such embodiments, a given storage device, storage service node, data center, or availability container need not be restricted to storing only un-encoded copies of storage objects, or to storing only encodings. The storage service may in some embodiments distribute encodings and/or un-encoded copies across storage devices or nodes based on the specific performance and other capabilities of the devices or nodes.

Example System Environments

FIG. 1 illustrates an example of a system in which a storage service is configured to support high durability using un-encoded copies and encoded combinations of storage objects, according to at least some embodiments. It is noted that FIG. 1 is a simplified presentation of some the core concepts of the durability mechanism, not intended as a detailed representation of an actual implementation. For ease of explanation, for example, un-encoded copies of only a single durability group 150A are shown, the storage objects of that durability group are assumed to be of the same size, and a relatively simplistic distribution of encodings and un-encoded copies associated with durability group 150A is shown.

System 100 includes a provider network 102 within which a storage service accessible to clients 170 is implemented in the depicted embodiment. The provider network may include a plurality of availability containers 110, such as availability containers 110A, 110B and 110C, each comprising a plurality of service nodes 122 (e.g., service nodes 122A and 122B of availability container 110A). Service nodes 122 may also be referred to as "storage nodes" and/or "back-end nodes". A given service node 122 may, for example, include some amount of storage space (e.g., one or more disk-based storage devices, solid-state drives, or the like), as well as some computation resources (CPUs or processing cores), memory, networking resources and the like. Each availability container 110 may include numerous service nodes and/or other resources distributed among portions or all of one or more data centers, as described earlier, engineered in such a way that the availability profile (or failure profile) of each container is independent of the availability profile of other containers. That is, an occurrence of a failure (such as a storage device failure, CPU failure, electrical/power failure, a cooling system failure, or a networking link failure) in a given availability container is not expected to result in a correlated failure at any other availability containers. As a consequence of the design of the availability containers, storing respective copies of data at two different availability containers may result in substantially higher data durability than if the copies were stored within the same availability container, for example.

A durability manager 180 of the storage service is configured to determine how desired durability levels are to be supported for various storage objects 120 (e.g., 120A, 120B, 120C and 120D) using some combination of un-encoded copies and encodings. Clients 170 may submit storage-related work requests, such as requests to create, write, read, and/or delete storage objects 120, to work request routers 182 of the storage service, as indicated by arrow 133. Work request routers 182 may represent front-end components of the storage service, with network addresses accessible to clients 170. The work request routers 182 may redirect the work requests to the appropriate back-end service nodes 122 of the storage service, where the corresponding work operations (such as physical reads and writes) may be performed, as indicated by arrows 134A, 134B and 134C. It is noted that in some embodiments, clients may be permitted to submit work requests directly to the service nodes, and in some such embodiments work request routers 182 may not be implemented. In at least some embodiments, in addition to (or instead of) the work request routers 182, the durability manager 180 may read or write data to service nodes 122 (e.g., to store encodings on behalf of the clients, or to reconstruct un-encoded copies from encodings), as indicated by arrows 137A, 137B and 137C.

In the depicted embodiment, the durability manager 180 is responsible for aggregating various storage objects 120 into durability groups 150 (e.g., 150A and 150B), and using a hybrid approach for physical storage of the data of the durability group members, which includes storing some selected number of un-encoded or unmodified copies of the members' data, and some selected number of encodings derived from combinations of the members' data. It is noted that the terms "un-encoded copy" and "encodings" are used herein to distinguish storage object versions that clients initially generate (which are considered the un-encoded versions from the perspective of the service) from the products of computation functions applied by the service (which are considered encodings from the perspective of the service) to the client-generated versions. For example, a client may submit a text file containing one megabyte of English text as a storage object. A copy of the client-submitted file may be deemed "un-encoded" if, given the copy, the client is able to read and understand the contents of the file without any additional decoding. In contrast, if the storage service applies an erasure coding function, an exclusive-or function, or some other transformation to a portion or all of the file, or to a combination of contents of different files, the resulting output may be considered an encoding.

The durability manager 180 may also communicate with the work request routers 182, as indicated by arrow 167, e.g., to notify the work request routers 182 regarding the locations of various portions or replicas of un-encoded and encoded client data. In the depicted example, the durability manager 180 has decided to include four storage objects 120A, 120B, 120C and 120D within durability group 150A. The membership of DG 150A may have been determined based on the sizes of the objects 120A, for example, or on when the objects were written. An un-encoded copy of object 120A, UEC-120A-1, is stored at service node 122A within availability container 110A of the provider network. Similarly, un-encoded copy UEC-120B-1 of storage object 120B is stored at service node 122B in availability container 110B, un-encoded copy UEC-120C-1 of storage object 120C is stored at service node 122K in availability container 110B, and un-encoded copy UEC-120D-1 of storage object 120D is stored at service node 122L in availability container 110B.

In addition to the un-encoded copies, encodings derived from combinations of some of the members of durability group 150A are also stored, e.g., at the direction of durability manager 180 in the depicted embodiment. In various embodiments, different encoding functions or algorithms may be used, and different combinations of the members of each durability group may be encoded collectively using the selected functions or algorithms. In the depicted example, a simple exclusive-or (xor) operation is used to generate the encodings, and as noted above, the objects 120A, 120B, 120C and 120D are assumed to be identical in size. For example, encoding 135A, obtained by applying a bitwise exclusive-or to 120A, 120B and 120C (120A xor 120B xor 120C), is stored at service node 122P in availability container 110C, encoding 135B (120A xor 120C xor 120D) is stored at service node 122Q, encoding 135C (120A xor 120B xor 120D) is stored at service node 122R, and encoding 135D (120B xor 120C xor 120D) is stored at service node 122S.

The durability mechanism being used in the example of FIG. 1 is intended to enable the storage service to withstand the loss of any three service nodes, without irrecoverable loss of the contents of any of the storage objects of any durability group 150, while using less storage space than would be required if three full un-encoded copies of each storage object were stored. Since each data object 120A-120D has the same size, each encoding requires as much space as one of the storage objects (since a result of an exclusive-or operation takes as much space as any one of the operands). The total amount of storage space required is 8× the amount of space taken by any given storage object 120 of the durability group—4× for the four un-encoded copies, and 4× for the encodings. At the same time, the durability mechanism also allows local computation operations (such as substring searches, regular expression matches, or "grep"-like operations) to be performed efficiently at the service nodes where the un-encoded copies are stored, instead of requiring the storage objects to be reconstructed from encodings when such a computation is to be performed. With respect to a request for a supported local computation on the contents of storage object 120A, for example, one of the work request routers 182 may simply direct the request to service node 122A, where the computation may be performed, and the result of the computation may be returned (e.g., to the work request router 182 and thence to the requesting client 170).

Consider various examples of failures at three different service nodes, and how the various un-encoded copies and encodings may be reconstructed using the durability approach taken in FIG. 1's simplified example. Generally speaking, the reconstruction process in a given implementation may be dependent on mathematical properties of the encoding function used: for example, the exclusive-or operation has properties such as "A xor B xor C=(A xor B) xor C", "A xor A=0" and "A xor 0=A". If storage nodes 122A, 122B and 122K failed, for example, the service would need to reconstruct un-encoded copies of 120A, 120B and 120C using the encodings and UEC-120D-1. One way in which 120A could be reconstructed is, for example, to perform the following computations: (a) temp1=135A xor 120D (using encoding 135A and UEC-120D-1); (b) 120A=temp1 xor 135D (using temp1 and encoding 135D). Similarly, un-encoded copies of 120B or 120C could also be retrieved using analogous exclusive-or operations. In general, for durability group 150A, if any three un-encoded copies were lost as a result of a failure at respective service nodes 122, the un-encoded copies could each be recovered. If the storage nodes containing any three (or even all four) encodings were lost, but the un-encoded copies of the storage objects remained accessible, the encodings could be generated simply by performing exclusive-or operations on the un-encoded copies—e.g., if 135A, 135B and 135C were lost, the un-encoded copies of 120A, 120B and 120C could be used to regenerate 135A, un-encoded copies of 120A, 120C and 120D could be used to regenerate 135B, and un-encoded copies of 120A, 120B and 120D could be used to generate 135C. Also, if any combination of three artifacts (chosen from 120A-120D and 135A-135D) were lost, the remaining artifacts may be used to regenerate the lost ones. For the encoding approach illustrated in FIG. 1, for example, in one implementation any encodings that can be regenerated solely from intact un-encoded copies may first be regenerated, followed by all un-encoded copies, followed by the remaining encodings. It is noted that in contrast to the scenario illustrated in FIG. 1, at least in some embodiments, more than one of the artifacts for a given DG may be stored at a given service node. Storing more than one artifact at the same node or at the same device would typically result in lower durability than storing each of the artifacts at different devices or nodes, but such lower durability may well be sufficient for certain objects and/or for certain clients.

An example of a durability calculation for a scenario similar to that depicted in FIG. 1 follows. When computing the absolute durability (e.g., the absolute probability of losing the data of any given storage object), the failure rates of the storage devices (or service nodes) may be taken into account. Assume that each of the storage nodes 122 comprises a respective storage device, and that the storage device is the only type of component whose failure is relevant to the durability calculation. (This would be roughly equivalent to assuming that failures of other devices, such as CPUs, network cards and the like, are much less frequent than failures at storage devices.) Assume that the storage service is able to fully recover the desired durability one week after a storage device fails. Assume further that we have a storage device that will fail with a 1 in 20 chance each year, and (to simplify the calculations) that years are actually 50 weeks long instead of just over 52 weeks. Accordingly, there is a 1 in 1000 chance that a given storage device will fail each week. Assume further that when a storage device fails in any way, all its data is lost.

As a preliminary exercise, consider a scenario where two un-encoded copies of each storage object 120 are stored on different devices. The odds of a storage object's data being lost each week are the odds that both devices will fail the same week, or 1 in 10^6. The storage space required is twice that of the original data. Next consider the example of FIG. 1, where each of the 8 artifacts (the four un-encoded copies and the four encodings) is stored on a separate storage device at a respective service node. If any three storage devices are lost, as described above, all the data can be recovered. However, if four storage devices are lost, data may be lost. To avoid going into the details of which combinations of four lost storage devices will cause data loss, we will instead assume that all 70 combinations of losing four storage devices will cause us to lose data (there are 70 possible ways in which four devices can be chosen out of eight). This gives us a weekly failure rate of 70 in 10^12, for an overall failure rate for these four storage objects of once in 285 million years.

Thus, the technique illustrated in FIG. 1 is able to support a very high durability level, appropriate for many types of mission-critical applications. As mentioned earlier, in different implementations, several of the simplifying assumptions illustrated in FIG. 1 may not apply. For example, a given storage node may include both un-encoded copies and encodings, not all the members of a given durability group 150 may be the same size, and encoding algorithms more sophisticated than simple exclusive-or computations (such as various types of erasure coding schemes) may be used.

Figure 2:
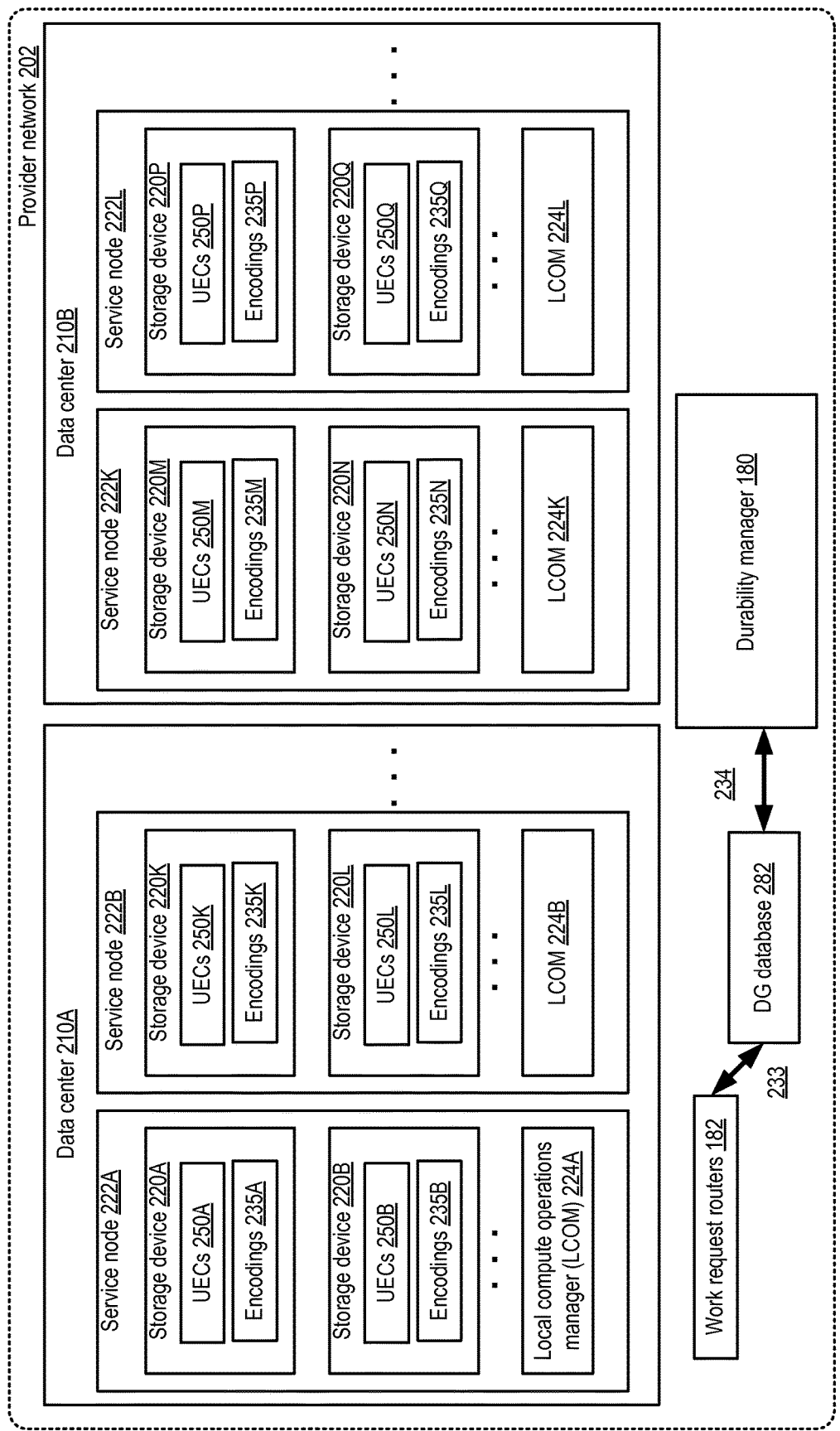
FIG. 2 illustrates an example of a provider network comprising multiple data centers, in which a given storage service node may store un-encoded copies and encodings of combinations of storage objects, according to at least some embodiments.

FIG. 2 illustrates an example of a provider network 202 comprising multiple data centers 210 (e.g., 210A and 210B), in which a storage service node may store un-encoded copies and encodings of combinations of storage objects, according to at least some embodiments. As shown, data center 210A comprises service nodes 222A and 222B, while data center 210B comprises service nodes 222K and 222L.

A given service node 222 of a storage service may include a plurality of storage devices 220 in the embodiment shown in FIG. 2, and a given storage device may be used to store un-encoded copies (UECs) 250 as well as encodings 235. For example, service node 222A includes storage device 220A with a set of UECs 250A and encodings 235A, and storage device 220B with UECs 250B and encodings 235B. Similarly, service node 222B comprises storage device 220K with UECs 250K and encodings 235K, and storage device 220L with UECs 250L and encodings 235L. Service node 222K at data center 210B includes service node 222K with storage devices 220M (containing UECs 250M and encodings 235M) and 220N (with UECs 250N and encodings 235N), while service node 222L includes storage devices 220P (with UECs 250P and encodings 235P) as well as 220Q (with UECs 250Q and encodings 235Q). Each storage device 220 may include UECs from diverse durability groups (not shown in FIG. 2), e.g., durability groups with different numbers of storage objects as members, with respective durability requirements, and with respective encoding techniques being used. In some embodiments, the durability manager 180 may store the locations of the various artifacts produced in accordance with the encoding plans (e.g., UECs and encodings) in a durability group database 282, as indicated by arrow 234. Work request routers 182 responsible for directing incoming work requests to service nodes may be provided access to the durability group database 282 in some embodiments, as indicated by arrow 233. Thus at least in some embodiments, the durability group database 282 may serve as part of a notification mechanism for work request routers 182 to obtain updated location information for various UECs and/or encodings.

In the depicted embodiment, each service node 222 may also include a respective local compute operations manager (LCOM) 224, such as LCOMs 224A at service node 222A, LCOM 224B at service node 222B, LCOM 224K at service node 222K, and LCOM 224L at service node 224L. Each LCOM may include one or more hardware and/or software components that are responsible for receiving requests (e.g., client-initiated requests redirected by the work request routers) for different types of local operations to be performed on storage objects 120, implementing the requested local operations, and returning the results of the local operations (e.g., to the work request routers and/or to the requesting clients). Libraries implementing a plurality of local operation types may be supported in different embodiments, such as various types of text-based search/match operations, statistical or scientific data analysis (e.g., signal processing operations of various types), and so on. The supported local operation types may be made known to clients 170, e.g., via one or more programmatic interfaces such as web sites or application programming interfaces (APIs) implemented by the storage service in some embodiments. In at least one embodiment, the storage service may also provide information regarding the expected performance (e.g., response times, throughputs and the like) for various types of local operations, and the associated pricing policies for the operations, so that clients may be able to make informed decisions regarding the costs and benefits of utilizing such features of the storage service.

Durability Manager Components

Figure 3:
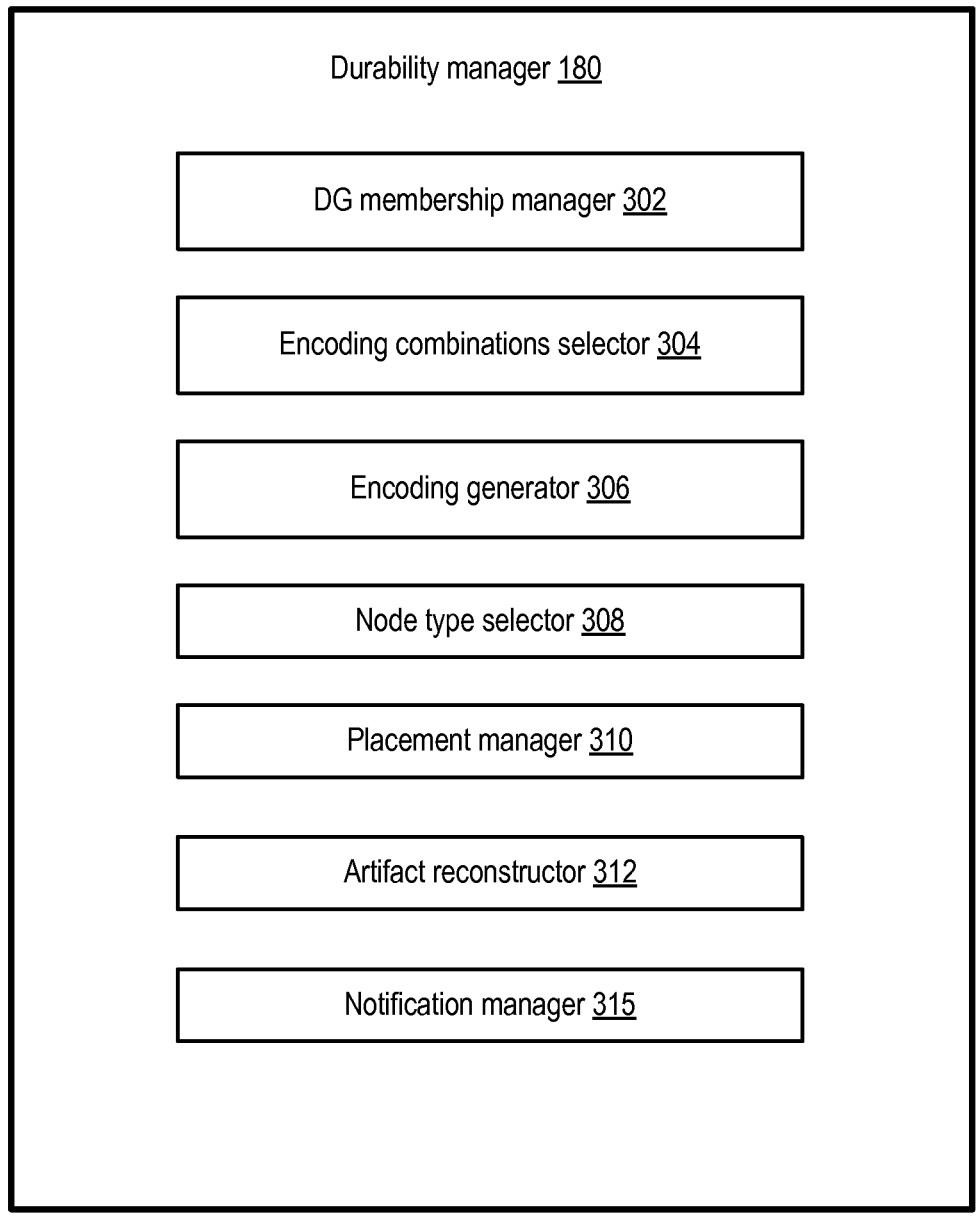
FIG. 3 illustrates example constituent elements of a durability manager of a storage service, according to at least some embodiments.

FIG. 3 illustrates example constituent elements of a durability manager 180 of a storage service, according to at least some embodiments. As shown, the durability manager 180 may comprise a DG (durability group) membership manager 302 responsible for determining which specific storage objects should be made members of various durability groups 150 to achieve the desired durability levels. As described below in the context of FIG. 4, in some embodiments durability groups may be formed in response to incoming write requests. Some of the factors that may be taken into account by DG membership manager 302 when selecting DG members may include, for example, the temporal proximity of write requests to different storage objects, the sizes of the storage objects, ownership information (e.g., which particular client entity, such as a particular user or business with a client account set up with the provider network, owns a given storage object may help determine whether that storage object should be added to a particular DG), and the like.

In at least some embodiments in which a DG comprises N storage objects, a given encoding generated by the durability manager 180 may be derived from only a subset of the members of the DG (i.e., using a function or algorithm that takes less than N storage objects as inputs). In the simplified scenario shown in FIG. 1, for example, there are four storage objects 120 in DG 150A, and each encoding 135 is derived from the contents of three storage objects. Depending on the encoding algorithm used, the durability manager may have to select which specific subsets of the members of a given DG should be combined for encoding purposes—e.g., given members A, B, C, D, and E of a DG and an encoding function that is to generate 5 encodings of three members at a time, which specific triplets of A, B, C, D and E should be used. An encoding combination selector 304 may be responsible for identifying the appropriate combinations of DG members in the depicted embodiment.

Encoding generator 306 may be configured to select and/or implement the computation algorithm(s) used to obtain the encodings in the depicted embodiment. Different algorithms may be used in different implementations, depending for example on the durability requirement for a given DG, the computation resources available for the encodings, the client's budget, and so on. In some embodiments, the particular algorithm used for a given storage object may also be dependent on factors such as an anticipated access rate and/or the rate at which requests for local computations are expected, a target or goal for object reconstruction time, and so on.

Node type selector 308 and placement manager 310 may collectively help determine the locations at which the artifacts (un-encoded copies and encodings) corresponding to various storage objects are to be stored. For example, depending on their relative compute performance capabilities and storage-related performance capabilities, in one embodiment the nodes of a storage service may be categorized into some number of capability levels, and the node type selector 308 may be configured to determine the categories of nodes at which one or more un-encoded copies or encodings of a given DG should be stored. Using the node type information determined by the node type selector 308, and/or information about the locations of various nodes in the data center(s) of the provider network, the placement manager 310 may identify which specific service nodes should be used for a given DG's UECs and encodings. In at least some embodiments, the node type selector 308 and/or the placement manager 310 may utilize access history information for storage objects implemented using the storage service when deciding the types of nodes or the specific nodes to be used for a given DG. For example, an analysis of access history information associated with earlier-created storage objects that contain application X's data may help with placement decisions for a new storage object being created for application X or related application Y. If, for example, local computations tend to be performed very frequently on the existing storage objects of application X, node type selector 308 may place a greater weight on selecting appropriately-configured service nodes for the local computations on UECs than on the performance capabilities of the nodes at which the encodings are stored.

In the embodiment illustrated in FIG. 3, artifact reconstructor 312 may be responsible for performing the computations necessary to restore the un-encoded copies or versions of the storage object, as well as any encodings that need to be reconstructed, in the event of failures that render some number of the original artifacts inaccessible. Notification manager 315 may be responsible for generating notifications, e.g., to work request routers 182, to ensure that client work requests are directed to the appropriate service nodes. In one embodiment, for example, various work request routers 182 may subscribe (e.g., as listeners) to notification mechanisms implemented by notification manager 315, or view contents of notification message queues used by the notification manager. In some embodiments, notifications may be provided in the form of updates to a DG database 282. Work request routers 182 may maintain caches of location information for DG contents (e.g., UECs and encodings) in some embodiments, and notification manager 315 may inform work request routers when the caches should be invalidated and/or updated in different embodiments. It is noted that in various embodiments, one or more of the constituent elements of durability manager 180 that are illustrated in FIG. 3 may not be implemented, and/or other elements not shown in FIG. 3 may be implemented. For example, in an embodiment in which all service nodes have identical capabilities, node type selector 308 may not be required.

Durability Group Membership

In at least some embodiments, a storage service may implement a write-once model, according to which each write request results in a new physical storage object being created to store the modification indicated in the request, and in-place updates are not supported. For example, a 4-megabyte storage object with an object identifier S1 may be created starting at location X on a physical storage device. When a write request directed to a location within the first 4 megabytes of S1 is received, a new copy of the first 4 megabytes of S1 may be created, e.g., starting at location Y on the same physical storage device or a different physical storage device, and the original copy may (either immediately or eventually) be marked as obsolete or deleted in some embodiments. In some storage services that support the write-once model, writes may be performed in discrete units or chunks—e.g., 1-megabyte chunks may be supported for some storage objects, 4-megabyte chunks may be supported for other storage objects, and so on, such that a write requested to a given chunk results in a new version of the chunk being written to physical storage. In at least some embodiments in which the write-once model of storage is implemented, each write request may thus represent the creation of a new storage object, and membership in durability groups may be determined for each of the storage objects resulting from incoming write requests. Thus, in such embodiments, the times at which durability group membership is decided may be governed at least in part by the times at which write requests are received.

Figure 4:
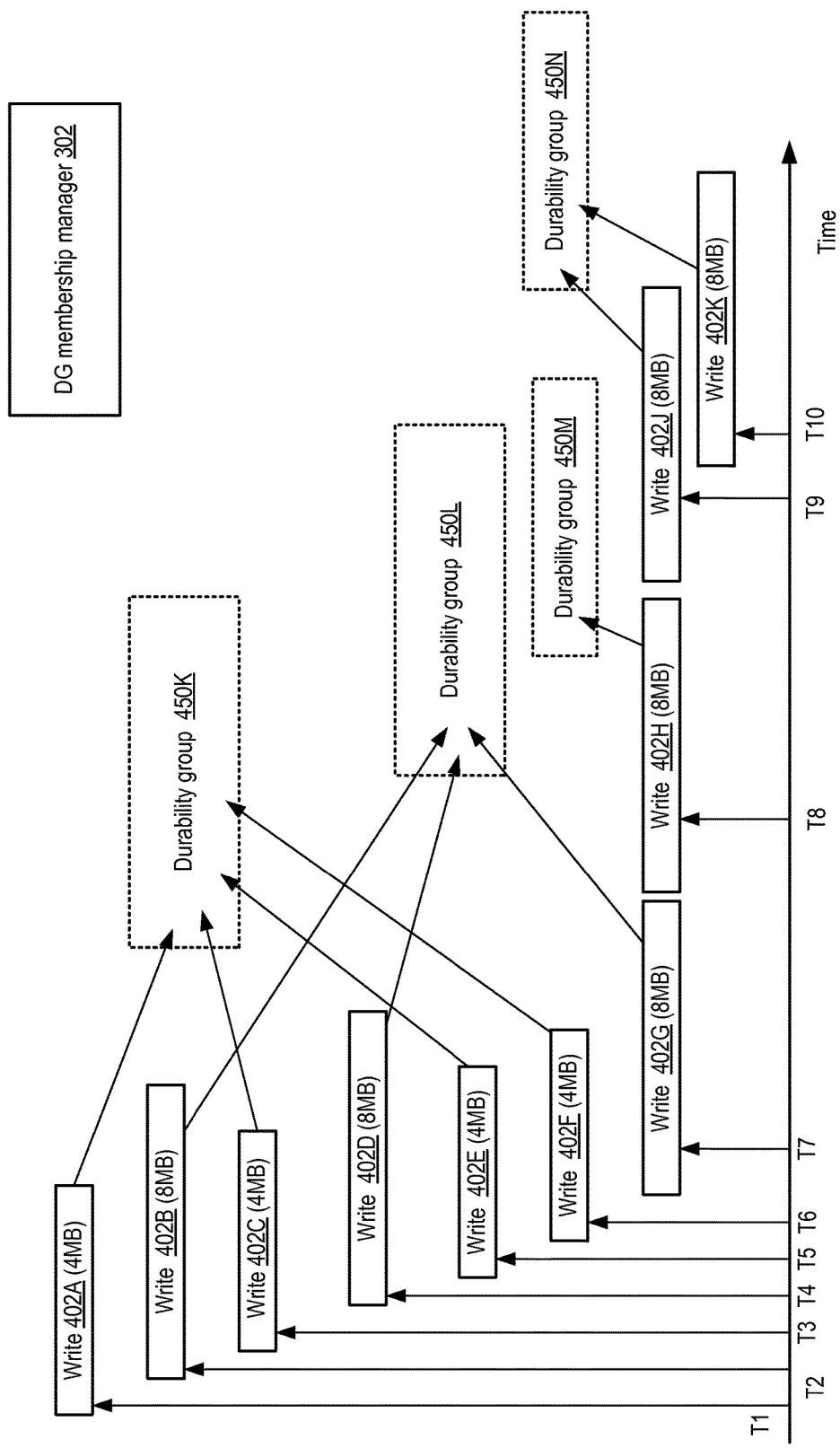
FIG. 4 illustrates an example approach to combining storage objects into durability groups, according to at least some embodiments.

FIG. 4 illustrates an example approach to combining storage objects into durability groups, according to at least some embodiments. A sequence of write requests are received at the storage service in the depicted embodiment, with elapsed time increasing from the left to the right. Write requests of two sizes are shown by way of example: 4-megabyte (4 MB) writes and 8-megabyte (8 MB) writes. Note that if a write-once model is used, and writes are permitted only in 4 MB chunks or 8 MB chunks, a modification to any amount of data smaller than 4 MB may result in a 4 MB chunk write, and a modification to data larger than 4 MB and smaller than 8 MB may result in an 8 MB write. The write requests shown in FIG. 4 may not necessarily represent updates to pre-existing storage objects (e.g., they may each represent the creation of a respective new object), and may not necessarily represent requests directed to a write-once storage system, however.

In FIG. 4, 4 MB write requests are received at times T1 (write 402A), T3 (402C), T5 (402E), and T6 (402F). 8-MB write requests are received at times T2 (402B), T4 (402D), T7 (402G), T8 (402H), T9 (402J) and T10 (402K). Each write request 402A-402K results in a new storage object being created. The durability manager 180 (e.g., using its DG membership manager component 302) combines the storage objects into DGs based at least in part on the write sizes, and at least in part on the timings of the write requests. In at least some implementations, the contents of the write requests (i.e., the modified data) may be held in volatile or main memory at one or more devices of the storage service while the DG is populated, and the maximum amount of time the service can take to populate a given DG may be constrained, for example, to avoid running low on memory.

Generally speaking, the following guidelines may be used for DG generation in the depicted embodiment: (a) storage objects resulting from write requests of the same size that are received close to each other in time (e.g., within a DG membership time window 470, whose duration may be a function of memory size constraints as mentioned above) are combined into a DG; (b) to the extent possible, storage objects of different sizes are not combined into a given DG and (c) if two write requests of the same size occur at times further apart than the time window 470, they are not combined into a DG despite their equal size, even if an adequate number of members have not been found for a DG with members of that size. The optimum number of members of a DG may typically be a function of the encoding algorithm that the durability manager 180 decides to use for the DG. However, in at least some embodiments such as that depicted in FIG. 4, if the optimum number of members cannot be identified within some time limit such as time window 470, a DG with fewer members may be generated.

In accordance with these guidelines, a DG 450K with four members corresponding to 4 MB writes 402A, 402C, 402E and 402F may be formed by DG membership manager 302 in the depicted embodiment. All four of these write requests arrive at times within time window 470 of each other. For 8 MB writes, the DG membership manager 302 may create a DG 450L initially populated with the storage object corresponding to write 402B received at time T2. The DG membership manager 302 may wait for additional 8 MB write requests that arrive within time window 470 with respect to T2. In the depicted example, 8 MB write requests 402D (at time T4) and 402G (at time T7) match this time window criterion, while the next 8 MB write request 402H (time T8) falls outside the time window. Accordingly, even though the optimum number of members of the DG 450L may be four, only three storage objects corresponding to write requests 402B, 402D and 402G may 450L. A new DG 450M may be established for 8 MB write request 402H, as no other 8 MB write request is received within time window 470 either before or after T8. DG 450N may be created for 8 MB requests 402J and 402K received at times T9 and T10 (which are close enough to fall within time window 470).

In various embodiments, different approaches may be taken to generating encodings for "incomplete" DGs (such as DG 450M, which contains just one storage object although the optimum DG size is four). For example, the number of full un-encoded copies of the storage objects may be adjusted upwards for incomplete DGs in some implementations, or different combinations may be encoded than may have been encoded had the DG been fully populated in accordance with the selected encoding plan or algorithm. In some embodiments, incomplete DGs may not be supported—i.e., each DG may be required to include the optimum number of members as decided by the durability manager 180 or the DG membership manager 302.

Mapping Durability Group Artifacts to Storage Locations

Figure 5:
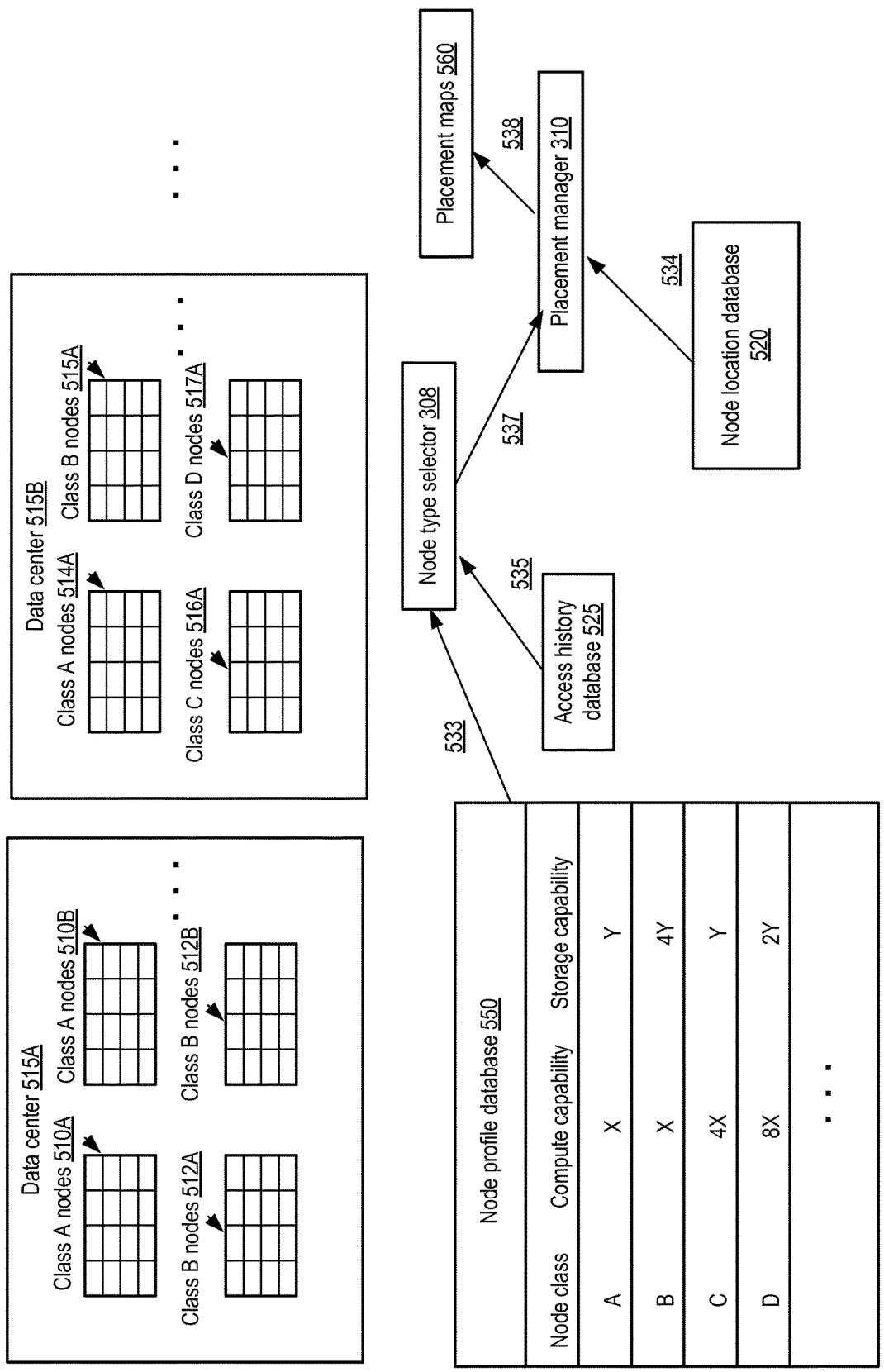
FIG. 5 illustrates an example approach to determining the placement of storage objects on storage service nodes, according to at least some embodiments.

FIG. 5 illustrates an example approach to determining the placement of storage objects on storage service nodes, according to at least some embodiments. In the depicted embodiment, a given storage service node may be classified based on its compute and/or storage capabilities, as indicated by node profile database 550. For example, a service node may be termed a "class A" node if its compute capability is X (as expressed in, for example, operations per second of a reference compute workload) and its storage capability is Y (as expressed in storage operations per second of a specified type, and/or based on the storage space available at storage devices of the node). Similarly, a node with compute capability X and storage capability 4Y may be termed a "class B" node, a node with compute capability 4X and storage capability Y may be termed a "class C" node, and a node with compute capability 8X and 2Y may be termed a "class D" node. Various other node classes may be defined in node profile database 550 in different embodiments; the node classes shown in FIG. 5 are examples, and are not intended to limit the node classification schemes that may be used.

As shown, in the depicted embodiment, a given data center 515 may include nodes of one or more of the classes. For example, data center 515A includes two sets of class A nodes, 510A and 510B, and two sets of class B nodes, 510C and 510D. data center 515B includes class A nodes 514A, class B nodes 515A, class C nodes 516A, and class D nodes 517A. The node type selector 308 of durability manager 180 may utilize the node profile database 550, as well as access history database 525, to identify the types of nodes that should be used for each of the artifacts of a given DG 150, as indicated by arrows 533 and 535. For example, access history database 525 may provide a history of how often local computation operations were performed relative to the lifetimes of storage objects, which may be helpful in identifying the computation profiles of the nodes that should be used; or the access history database may indicate how often storage objects owned by a given client entity are typically read and what the typical read sizes are, which may be useful in identifying the storage characteristics of the nodes to be used.

Node type selector 308 may select the kinds of nodes to be used, and provide an indication of the selected node classes to placement manager 310 in the depicted embodiment, as indicated by arrow 537. Placement manager 310 may in turn consult a node location database 520 (as indicated by arrow 534), which stores current information regarding the availability of specific classes of service nodes at various data centers 515. In accordance with the durability requirements of the storage objects being considered for placement, the placement manager 310 may generate placement maps 560 that specify which storage nodes (and/or specific storage devices) are to store which artifacts (e.g., where un-encoded copies for a DG are to be stored, and where the encodings are to be stored).

Methods for Durability Management Using UECs and Encodings

Figure 6:
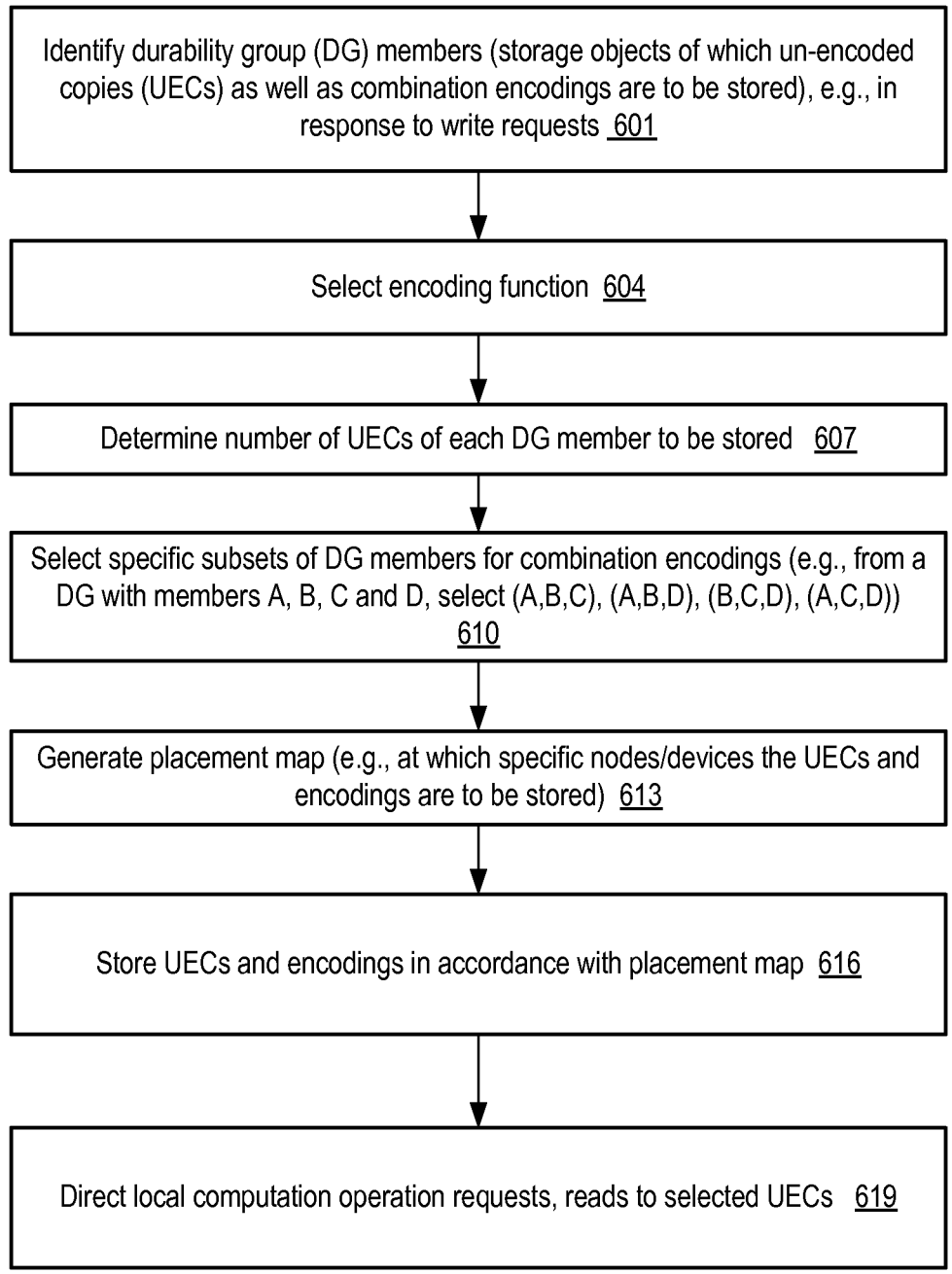
FIG. 6 is a flow diagram illustrating aspects of operations that may be performed at a storage service to support high durability, according to at least some embodiments.

FIG. 6 is a flow diagram illustrating aspects of operations that may be performed at a storage service to support high durability, according to at least some embodiments. As shown in element 601, a durability manager 180 of a storage service may be configured to identify members of durability groups, i.e., storage objects of which combination encodings (i.e., encodings of several group members) are to be stored in addition to un-encoded copies, to achieve a desired durability level and/or to support local computations (such as text search, regular expression matching, substring matching, and the like) efficiently. In some embodiments, DG membership decisions may be triggered as a result of receiving write requests, as illustrated in FIG. 4. Storage objects may be included in a durability group based on various factors such as similar sizes, proximity in the timing of write requests to the storage objects, common ownership by the same client entity, logical relationships between the objects (e.g., objects belonging in the same directory of a namespace may be more likely to be included in the same durability group, in comparison to objects of different namespaces), and so on.

The encoding function, i.e., the computations to be performed or the algorithms to be executed on the storage objects to generate the encodings, may be determined (element 604). For example, in some implementations, variants of the exclusive-or computations described with reference to FIG. 1 may be used, while in other embodiments, erasure encoding techniques and/or other algorithms may be utilized. The number of un-encoded copies (UECs) of the various members of a DG may be determined (element 607). In some implementations, the same number of UECs may be stored of each of the members of a DG, while in other embodiments, different members may have different numbers of UECs stored. It is noted that at least in some implementations, the number of UECs to be stored for at least some storage objects may be predetermined (e.g., based on default parameters), and may not need to be computed in real time. The specific combinations of DG members for which encodings are to be generated may then be determined (element 610)—for example, for a DG with five members A, B, C, D and E, combinations (A,B,C,D), (A,B,D,E), (B,C,D,E) and (A,B,C,E) may be selected for encoding. It is noted that in some embodiments, the choice of combinations may result in an asymmetry with respect to recoverability of the artifacts—e.g., some artifacts may be reconstructed if at most K failures occur, while other artifacts may be reconstructed if L failures (where L>K) occur. In some such embodiments, the choices of the combinations may be made based at least in part on such asymmetry—e.g., artifacts that are expected to benefit from relatively higher durability may be selected for the L-failure recoverability, while other artifacts may be selected for K-failure durability.

A placement map indicating the specific nodes at which each of the artifacts is to be stored may then be generated (element 613), e.g., using a process similar to that shown in FIG. 5. The operations corresponding to elements 604, 607, 610 and 613 may be collectively referred to as the generation of encoding plans for DGs. Various components of the encoding plan associated with a given DG may be determined based on some combination of criteria such as the following: (a) the sizes of the storage objects that are members of the DG, (b) an expected frequency of local computation operations directed at one or more of the DG members, (c) an expected frequency of access requests directed at one or more of the DG members, (d) expected lifetimes of the members (e.g., how long the storage objects are expected to remain accessible before being deleted), (e) a metric of an expected amount of computation required to reconstruct the various storage objects of the DG using one or more of the encodings, or (f) a metric of a computational capacity of a node of the storage service at which either an un-encoded copy of one or more of the members of the DG, or one or more encodings of the DG members are to be stored. The UECs and the encodings may then be stored in accordance with the placement map (element 616). Requests for supported types of local computations may subsequently be directed to the nodes that store selected UECs of the storage objects (element 619).

Figure 7:
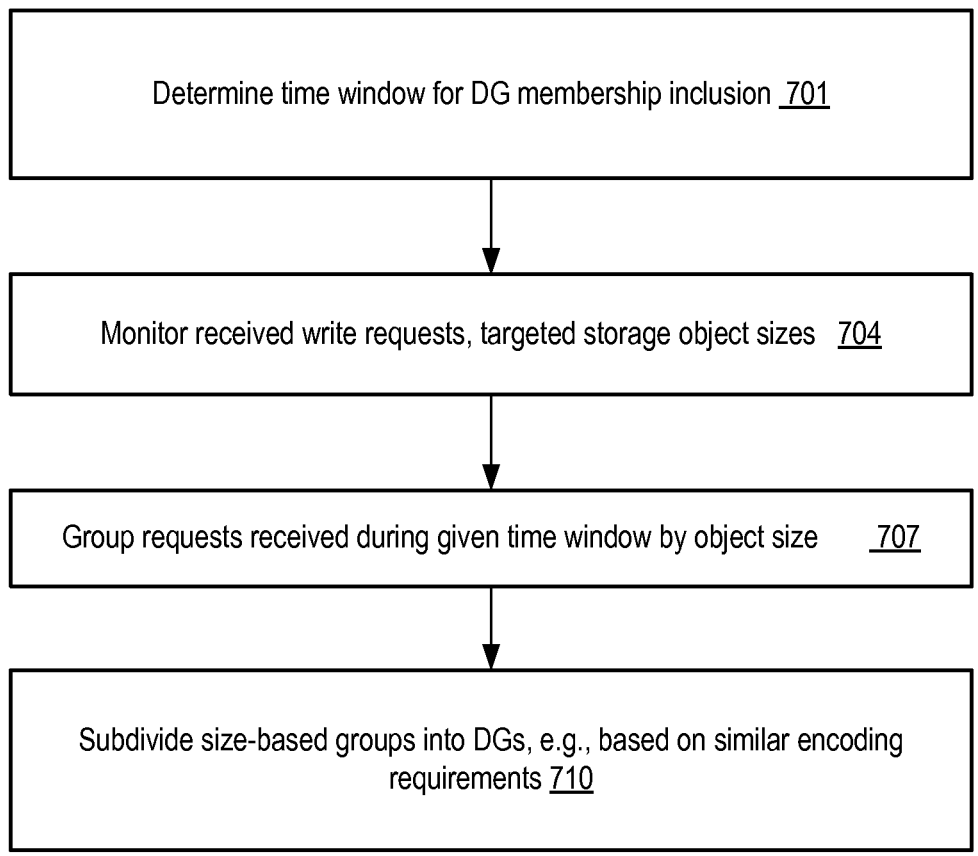
FIG. 7 is a flow diagram illustrating aspects of operations that may be performed to determine durability group membership, according to at least some embodiments.

As described earlier in the context of FIG. 4, in at least some embodiments decisions regarding durability group membership may be made in response to write requests, and that the relative timings and sizes of write requests may be considered when determining whether a particular storage object is to be included in a durability group in such embodiments. FIG. 7 is a flow diagram illustrating aspects of operations that may be performed to determine durability group membership, according to at least some embodiments. As shown in element 701, a time window TW for DG membership inclusion may be determined, e.g., based on configuration settings or on heuristics. If up to N storage objects, each of size S (or a size close to S), are to be included in a DG, and N write requests of the appropriate sizes are received during a time window TW, the N storage objects corresponding to the write requests may be selected for inclusion in a DG. It is noted that at least in some embodiment, not all the members of a durability group need be equal in size.

The storage service (e.g., a DG membership manager component 302 of a durability manager 180 of the service) may monitor write requests as they occur (element 704), as well as the sizes of the target storage objects of the write requests. Based on an analysis of the timing and sizes of the writes, the storage objects that are written to during a given time window TW may be grouped by size (element 707) in the depicted embodiment. Depending on the total number of write requests of each size that are received in the time window TW, some number of DGs may be established, e.g., based on the durability requirements of the storage objects (element 710). For example, if the storage system supports two different levels of durability D1 and D2, durability groups for objects with durability level D1 may typically be set up (assuming enough write requests of a similar size are received within the time window TW) with N1 members, while durability groups for objects with durability level D2 may typically be set up with N2 members, where N1 differs from N2. If not enough write requests arrive during a given time window, a DG with fewer than optimal members may be created in at least some embodiments. After the write requests received during a given time window are aggregated into DGs, another time window may be started (e.g., corresponding to the arrival of a new write request). In some embodiments, time windows of different durations may be used for different durability levels. In other embodiments, time windows may not be used at all, and the storage service may simply wait until enough write requests are received for a DG to be created. In at least one embodiment, DG creation need not be tied to write request arrival times at all, and storage objects may be assigned to durability groups regardless of the times at which they are created or updated.

Figure 8:
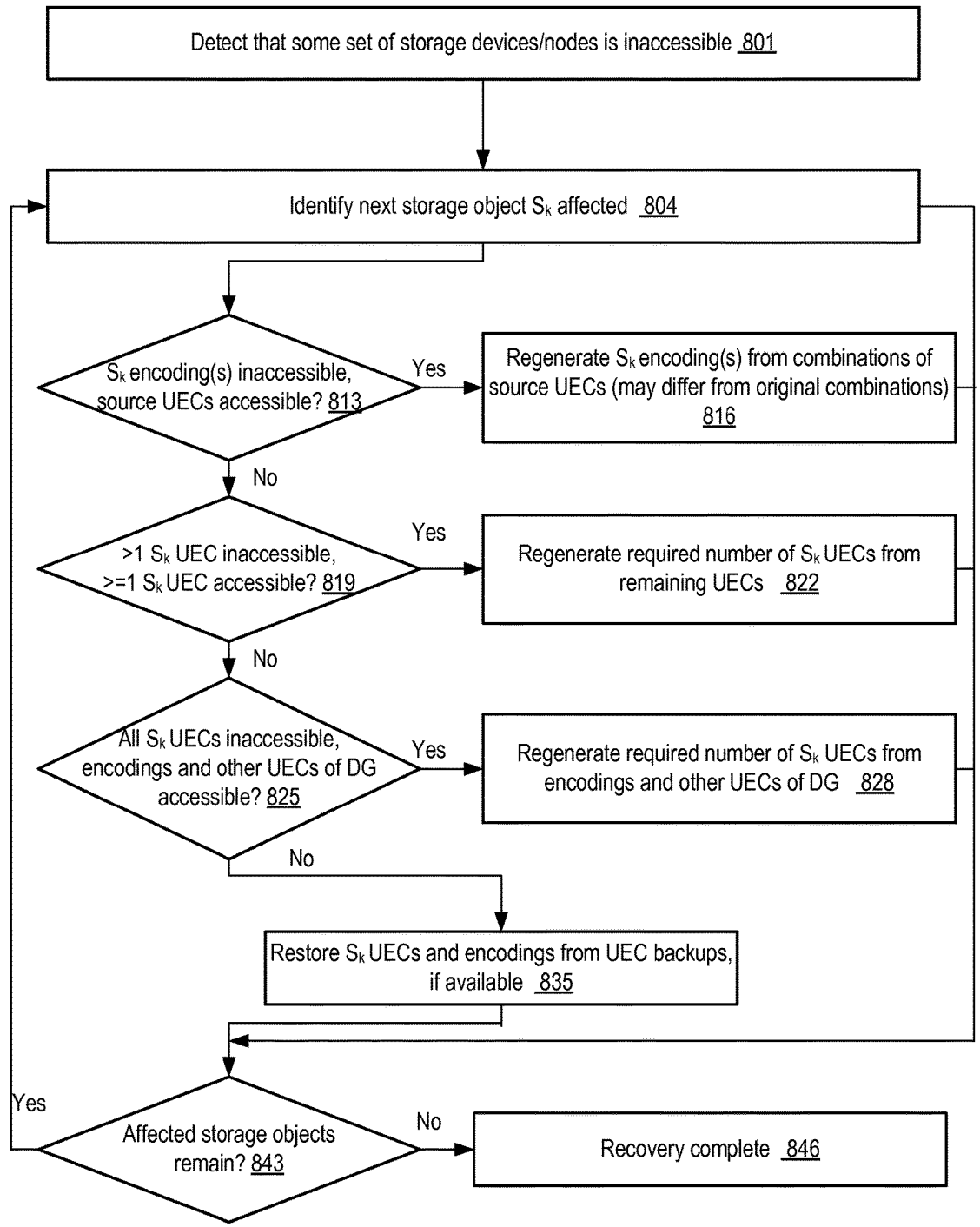
FIG. 8 is a flow diagram illustrating aspects of operations that may be performed to recover storage objects in the event of one or more failures, according to at least some embodiments.

FIG. 8 is a flow diagram illustrating aspects of operations that may be performed to recover storage objects in the event of one or more failures, according to at least some embodiments. As shown in element 801, a storage service component such as durability manager 180 may detect that some set of storage devices or nodes is not accessible, e.g., as a result of hardware and/or software failures. Artifact reconstructor 312 or another component may identify the set of storage objects that may have been affected, and may initiate a recovery operation for such identified storage objects. For each potentially affected storage objects, the reconstructor may determine the (potentially empty) set of un-encoded copies that remain accessible, and the (potentially empty) set of encodings associated with the object. In some embodiments, a loop of operations corresponding to elements 804 of FIG. 8 onwards may be repeated for each potentially affected storage object.

As shown in element 804, during a given iteration of the loop, the next storage object Sk among those potentially affected may be identified. If some of the encodings associated with Sk are found to be inaccessible or affected by the failure(s), but the source un-encoded copies (e.g., UECS of various members of Sk's DG) from which the encodings can be determined remain unaffected, as determined in element 813, new encodings to replace the inaccessible ones may be generated (element 816). It is noted that in at least some embodiments, depending for example on the encoding algorithm being used and/or on the specific UECs that survive the failure(s), a different set of encodings may be generated in operations corresponding to element 816 than were present before the failure(s).

If some UECs of Sk are inaccessible, but at least one UEC of Sk remains accessible, as detected in element 819, the required number of replacement UECs may be generated by copying from the accessible UEC(s) (element 822). If all the UECs of Sk are no longer accessible, but a combination of one or more encodings of Sk and UECs of other members of the durability group are accessible, from which an Sk UEC can be obtained (as detected in element 825), the encodings and UECs of the other DG members may be used to reconstruct the required number of Sk UECs (element 828). In some scenarios, it may not be feasible to reconstruct the Sk UECs from the surviving artifacts, in which case Sk UECs and/or encodings may be recovered from backups, if appropriate backups are available (element 835). After Sk recovery has been addressed, if other potentially affected storage objects remain (as detected in element 843), the next such storage object may be considered, and operations corresponding to elements 804 onwards may be repeated for that storage object. It is noted that even if Sk recovery is not successful, if other affected storage objects remain in the same DG and are subsequently recovered, then recovery for Sk may be retried at that time in at least some embodiments. Otherwise, recovery for the set of storage objects affected by the failure(s) may be deemed complete (element 846).

It is noted that in different embodiments, the operations illustrated in the flow diagrams of FIGS. 6, 7 and 8 may be performed in a different order than shown, or in parallel instead of sequentially. In some embodiments, some of the illustrated operations may be omitted, and/or other operations may be performed.

Use Cases

The techniques described above, of implementing high-durability storage solutions using some numbers of un-encoded copies of storage objects together with encodings of selected combinations, may be useful in a variety of different scenarios. For example, in some storage environments, other approaches to high durability may typically involve partitioning objects followed by encoding the partitions, which may require a substantial overhead to decode and/or reconstruct the objects before certain types of operations (such as text searches and grep-like operations) can be implemented. The hybrid approach outlined herein may help reduce the overheads and accompanying delays that result from such fully-partitioned and fully-encoded approaches, while sacrificing relatively little in terms of storage space used to achieve desired durability levels.

Illustrative Computer System

Figure 9:
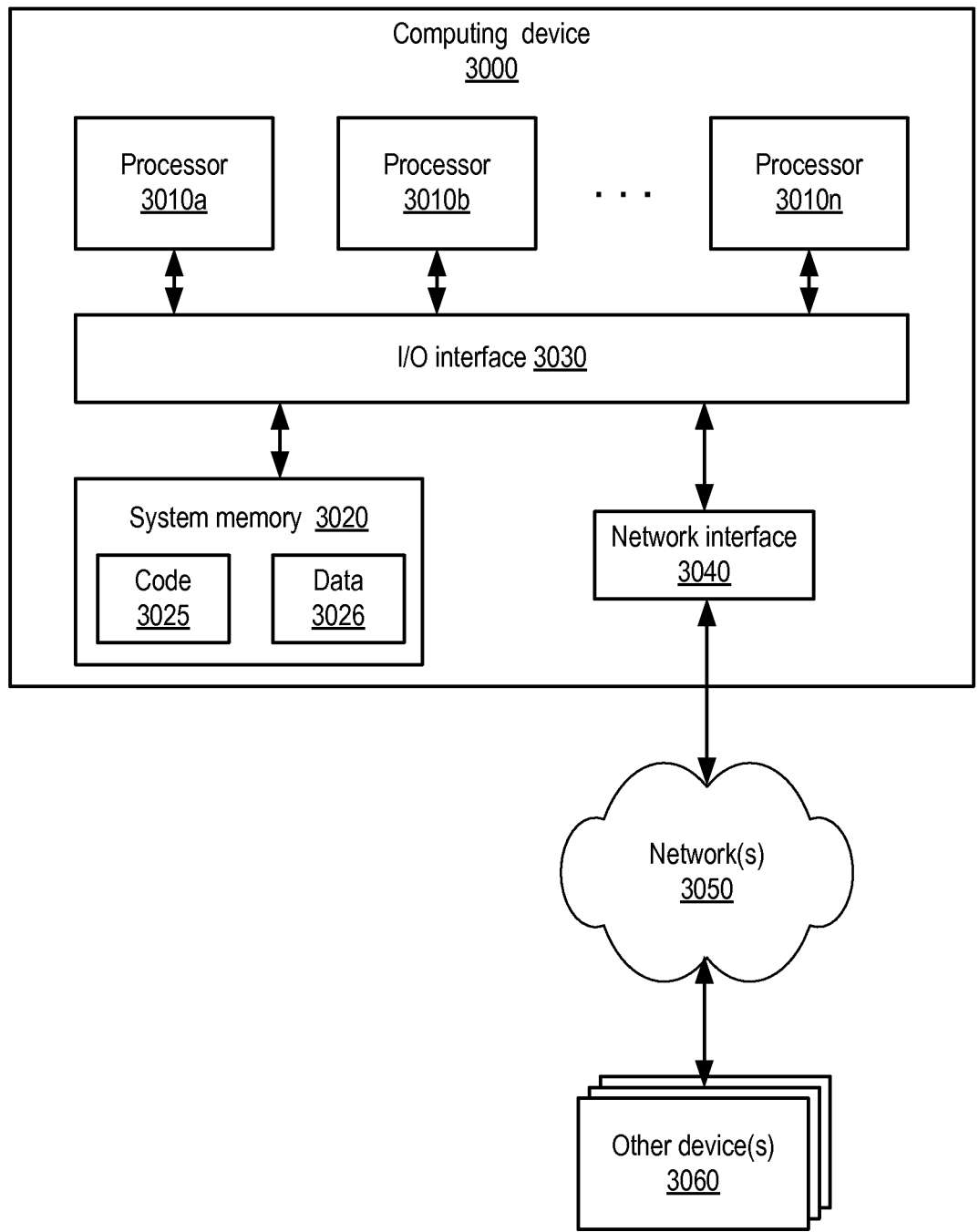
FIG. 9 is a block diagram illustrating an example computing device that may be used in at least some embodiments.

In at least some embodiments, a server that implements a portion or all of one or more of the technologies described herein, including the techniques to implement durability managers, work request routers, or storage service nodes, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
identify one or more storage objects to be included in a durability group with a particular storage object, wherein an encoding of a combination of at least the particular storage object and at least one other storage object of the durability group is to be stored at a node of a network-based storage service to achieve a target data durability, wherein the particular storage object and at least the one other storage object are accessible as distinct storage objects by a client of the storage service;
determine a number of un-encoded copies of the particular storage object to be stored, in addition to the encoding, to achieve the target data durability and a desired level of performance for a set of local computation operation types supported by the storage service;
generate an encoding plan specifying (a) storage objects of the durability group to be combined for the encoding, (b) a computation function to obtain the encoding, and (c) a placement map indicating respective nodes of the storage service to be used to store the number of un-encoded copies and the encoding, wherein the encoding plan indicates the number of un-encoded copies of the particular storage object to be placed on respective nodes of the storage service that supports local execution of the set of local computation operation types;
encode the storage objects specified in the encoding plan according to the computation function specified in the encoding plan to obtain the encoding, wherein the storage objects specified in the encoding plan include at least the particular storage object and at least one other storage object of the durability group as operands to the computation function;
store, at the nodes indicated in the placement map, the encoding and the number of un-encoded copies of the particular storage object; and
subsequent to the encoding having been created and stored, and in response to a request from a client of the storage service and received via a network interface to the network-based storage service, the request to perform, on the particular storage object, a local computation operation of a type included in the set of local computation operation types:
direct the request to a particular node of the storage service at which an un-encoded copy of the particular storage object is located to retrieve the un-encoded copy of the particular storage object,
retrieve the un-encoded copy of the particular storage object, or in response to a detection that at least one of the un-encoded copies of the particular storage object is inaccessible, reconstruct an un-encoded copy of the particular storage object based at least in part on the encoding,
perform the local computation operation on the retrieved un-encoded copy or the reconstructed un-encoded copy of the particular storage object at the storage service, and
return a result of the local computation to the client via the network interface.

2. The system as recited in claim 1, wherein the other storage object is selected for inclusion in the durability group based at least in part on one or more of: (a) a size of the other storage object, or (b) a time at which a write request directed to the other storage object is received.

3. The system as recited in claim 1, wherein at least one of (i) the encoding plan or (ii) the number of un-encoded copies is based at least in part on one or more of: (a) a size of the particular storage object, (b) an expected frequency of local computation operations directed at the particular storage object, (c) an expected frequency of access requests directed at the particular storage object, (d) an expected lifetime of the particular storage object, (e) a metric of an expected amount of computation required to reconstruct the particular storage object based at least in part on the encoding, or (f) a metric of a computational capacity of a node of the storage service.

4. The system as recited in claim 1, wherein the placement map indicates that a first un-encoded copy of the particular storage object is to be stored in a first availability container of a provider network, a second un-encoded copy of the particular storage object is to be stored in a second availability container of the provider network, and the encoding is to be stored in a third availability container of the provider network, wherein each availability container of the first, second, and third availability containers has a respective independent availability profile.

5. The system as recited in claim 4, wherein the placement map indicates that the encoding is to be stored at a particular node of the third availability container, and that an un-encoded copy of the other storage object is to be stored at the particular node.

6. A method, comprising:
performing, by one or more computing devices:
identifying one or more storage objects to be included in a durability group with a particular storage object, wherein an encoding of a combination of at least the particular storage object and at least one other storage object of the durability group is to be stored at a node of a network-based storage service to achieve a target data durability, wherein the particular storage object and at least the one other storage object are accessible as distinct storage objects by a client of the storage service;
encoding the combination of at least the particular storage object and at least the one other storage object of the durability group to obtain the encoding;
storing the encoding and one or more un-encoded copies of the particular storage object at selected nodes of the storage service; and
subsequent to the encoding having been created and stored, and in response to receiving a request from a client of the storage service via a network interface, the request to perform, on the particular storage object, a local computation operation:
directing the request to a particular node of the selected nodes at which an un-encoded copy of the one or more un-encoded copies is located,
retrieving the un-encoded copy of the particular storage object located at the particular node,
executing the local computation operation on the retrieved un-encoded copy of the particular storage object at the storage service, and
returning via the network interface a result of the local computation operation to the client of the storage service.

7. The method as recited in claim 6, wherein the other storage object is selected for inclusion in the durability group based at least in part on one or more of: (a) a size of the other storage object, or (b) a time at which a write request directed to the other storage object is received.

8. The method as recited in claim 6, further comprising performing, by the one or more computing devices:
generating an encoding plan specifying (a) storage objects of the durability group to be combined for the encoding, (b) a computation function to obtain the encoding, and (c) a placement map indicating the selected nodes to be used to store the one or more un-encoded copies and the encoding.

9. The method as recited in claim 8, wherein at least one of (i) the encoding plan or (ii) the number of un-encoded copies stored is based at least in part on one or more of: (a) a size of the other storage object, (b) an expected frequency of local computation operations directed at the particular storage object, (c) an expected frequency of access requests directed at the particular storage object, (d) an expected lifetime of the particular storage object, (e) a metric of an expected amount of computation required to reconstruct the particular storage object based at least in part on the encoding, or (f) a metric of a computational capacity of a node of the storage service.

10. The method as recited in claim 6, wherein said storing comprises:
storing a first un-encoded copy of the particular storage object in a first availability container of a provider network;
storing a second un-encoded copy of the particular storage object in a second availability container of the provider network; and
storing the encoding in a third availability container of the provider network;
wherein each availability container of the first, second, and third availability containers has a respective independent availability profile.

11. The method as recited in claim 10, further comprising performing, by the one or more computing devices:
storing an un-encoded copy of a different storage object of the durability group in the third availability container.

12. The method as recited in claim 10, wherein the first un-encoded copy is stored in a different data center than the second un-encoded copy.

13. The method as recited in claim 6, wherein said identifying the one or more storage objects to be included in the durability group with the particular storage object is performed in response to receiving a write request.

14. The method as recited in claim 13, further comprising performing, by the one or more computing devices:
receiving the write request; and
analyzing one or more additional write requests, directed to one or more different storage objects, received within a time window during which the write request was received, to identify an additional storage object of the one or more different storage objects to be included in the durability group.

15. The method as recited in claim 6, further comprising performing, by the one or more computing devices:
generating the encoding using at least one of: (a) an exclusive-or (XOR) computation, or (b) an erasure coding computation.

16. A non-transitory computer-accessible storage medium storing program instructions that when executed on one or more processors:
identify one or more other storage objects to be included in a durability group with a particular storage object, wherein an encoding of a combination of at least the particular storage object and one of the one or more other storage objects of the durability group is to be stored at a node of a network-based storage service to achieve a target data durability, wherein the particular storage object and at least the one other storage object are accessible as distinct storage objects by a client of the storage service;
encode the combination of at least the particular storage object and at least the one other storage object of the durability group to obtain the encoding;
store the encoding and one or more un-encoded copies of the particular storage object at selected nodes of the storage service; and
subsequent to the encoding having been created and stored, and in response to a request received via a network interface from a client of the storage service, the request to perform, by the storage service on the particular storage object, a local computation operation:
  direct the request to a particular node of the selected nodes at which an un-encoded copy of the one or more un-encoded copies is located,
  retrieve the un-encoded copy of the particular storage object from the particular node,
  perform the local computation operation on the retrieved un-encoded copy of the particular storage object at the storage service, and
  return a result of the local computation operation to the client of the storage service via the network interface.

17. The non-transitory computer-accessible storage medium as recited in claim 16, wherein the other storage object is selected for inclusion in the durability group based at least in part on one or more of: (a) a size of the other storage object, or (b) a time at which a write request directed to the other storage object is received.

18. The non-transitory computer-accessible storage medium as recited in claim 16, wherein the instructions when executed on the one or more processors:
  generate an encoding plan specifying (a) storage objects of the durability group to be combined for the encoding, (b) a computation function to obtain the encoding, and (c) a placement map indicating the selected nodes to be used to store the one or more un-encoded copies and the encoding.

19. The non-transitory computer-accessible storage medium as recited in claim 18, wherein at least one of (i) the encoding plan or (ii) the number of un-encoded copies to be stored using the selected nodes is based at least in part on one or more of: (a) a size of the other particular storage object, (b) an expected frequency of local computation operations directed at the particular storage object, (c) an expected frequency of access requests directed at the particular storage object, (d) an expected lifetime of the particular storage object, (e) a metric of an expected amount of computation required to reconstruct the particular storage object based at least in part on the encoding, or (f) a metric of a computational capacity of a node of the storage service.

20. The non-transitory computer-accessible storage medium as recited in claim 16, wherein the instructions when executed on the one or more processors:
  store a first un-encoded copy of the particular storage object in a first availability container of a provider network;
  store a second un-encoded copy of the particular storage object in a second availability container of the provider network; and
  store the encoding in a third availability container of the provider network;
  wherein each availability container of the first, second, and third availability containers has a respective independent availability profile.

* * * * *